United States Patent [19]

Kimura et al.

[11] 3,753,391

[45] Aug. 21, 1973

[54] MOTOR-DRIVEN WINDING DEVICE OF CAMERA

[75] Inventors: Shuji Kimura, Setagaya-ku; Kouichi Daitoku, Ohta-ku, Tokyo, both of Japan

[73] Assignee: Nippon Kogaku K.K., Tokyo, Japan

[22] Filed: Dec. 9, 1971

[21] Appl. No.: 206,561

Related U.S. Application Data

[63] Continuation of Ser. No. 886,621, Dec. 19, 1969, abandoned.

[52] U.S. Cl. ........................... 95/53, 95/1, 95/35 E, 318/558

[51] Int. Cl. ............................................ G03b 9/00

[58] Field of Search ........................... 318/558; 95/1

[56] References Cited

UNITED STATES PATENTS

| | | | |
|---|---|---|---|
| 3,119,315 | 1/1964 | Lange et al. | 95/31 E |
| 3,138,080 | 6/1964 | Jacobson | 95/31 E |
| 3,080,713 | 10/1966 | Goldberg | 95/31 E |
| 3,460,451 | 8/1969 | Starp et al. | 95/10 C |

*Primary Examiner*—B. Dobeck
*Attorney*—John Thomas Cella

[57] ABSTRACT

A camera having a motor-driven winding device is provided with a detachable remote control unit having a shutter release button and a change-over switch to effect selection between single-frame phototaking and continuous phototaking. During remote control operation the change-over switch and shutter release button are electrically interconnected by means of an electrically conductive cord.

2 Claims, 5 Drawing Figures

MOTOR-DRIVEN WINDING DEVICE OF CAMERA

This is a continuation of application Ser. No. 886,621, filed Dec. 19, 1969 entitled "MOTOR-DRIVEN WINDING DEVICE OF CAMERA," now abandoned.

This invention relates to a motor-driven winding device for a camera which permits selection between single-frame and continuous phototaking at a remote controlled position even when the camera is under remote controlled operation.

It is desirable in a motor-driven winding device of a camera to be able to selectively switch between single-frame and continuous phototaking at a remote position when the camera is in remote controlled operation.

For this purpose, many proposals have been disclosed. According to one typical proposal, change-over switches are provided separately on the motor-driven section and a remote control section which is inserted between the motor-driven section and and electric source.

Furthermore this arrangement complicates the electric circuit when incorporating the battery in the motor-driven section or when attaching the battery directly to said motor-driven section.

Besides, in the conventional method, during remote controlled operation the battery is disconnected from the motor-driven section and in most cases, the remote controlling switch and change-over switch are assembled in the interior of the battery case, and the battery case and motor-driven section are connected by a cord. This results in an increase in the capacity and weight of the battery and causes operational incoveniences.

The object of this invention is to remove the above-mentioned defects by providing the change-over switch for continuous and single-frame phototaking and the operating button switch remote from the motor-driven section so that the change-over switch and operation button switch can also be used at a remote position by connecting the remote portion and the motor-driven section of the camera by a cord.

The present invention will be discribed in detail referring to an illustrative embodiment shown in the accompanying, in which.

Figure 1:
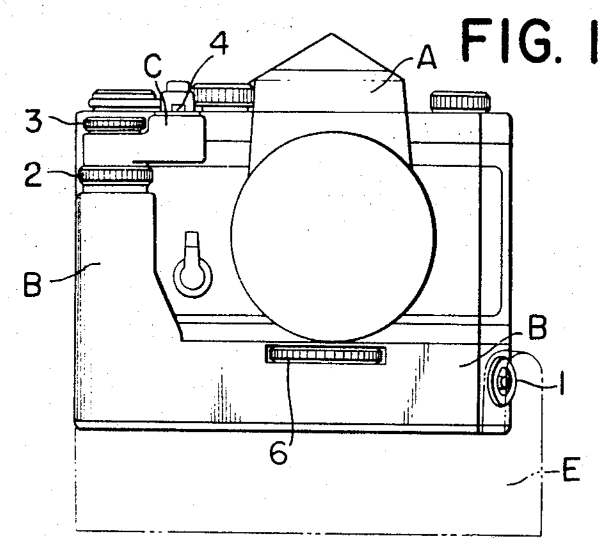
FIG. 1 is a front external view of an embodiment of this invention attached to the camera.

In FIGS. 1 through 5, A is a camera body having a threaded tripod socket, B is a motor-driven section having a clamping member 6 with a protruding screw which is screwed into the tripod socket and detachably mounted on the camera body A by a clamping member 6 C is a control device which is detachable from the top end of a portion of the motor-driven section B projecting in front of the camera body A, L is a remote control cord, N and N' are connectors provided on both ends of the cord L, and E is a electric source mounted on the motor-driven section B.

A terminal 1 is provided on the outer wall of the to motor-driven section B, a connector ring 2 rotatably provided on the control device B has a screw thread on the inner surface to be screwed to the top of the projecting portion B' for connecting the control device C and the motor-driven section B electrically and to secure the control device C to the motor-driven section B, while a knob 3 rotatably provided on the control device C is the change-over knob for single-frame and continuous phototaking. An operation push button 4 is provided on the control device C and another connector ring 5 similar to said connector ring 2 is installed on the connector N.

The control device C is so made in FIG. 1 as to be attached to the motor-driven section B of the motor-driven winding device, but it can also be made to be attached to electric a remote controlling connector N' source by extending the wiring thereto. A battery case E having batteries EH therein is provided below the motor-driven section B and is connected thereto through the terminal 1. Motor-driven section B has an electrical control circuit which contains a motor M, relay Re, transistor Tr, a switch $S_3$ operated by a mechanism for the operations of film winding, shutter charging and shutter releasing in response to the motor M.

On the other hand, the control device C comprises a switch $S_1$ which closes to form a circuit upon operation of the push button 4, a switch $S_2$ which is interlocked with the change-over knob 3 for switching between single-frame phototaking S and continuous phototaking R, and a circuit that connects these elements.

Figures 2, 3:
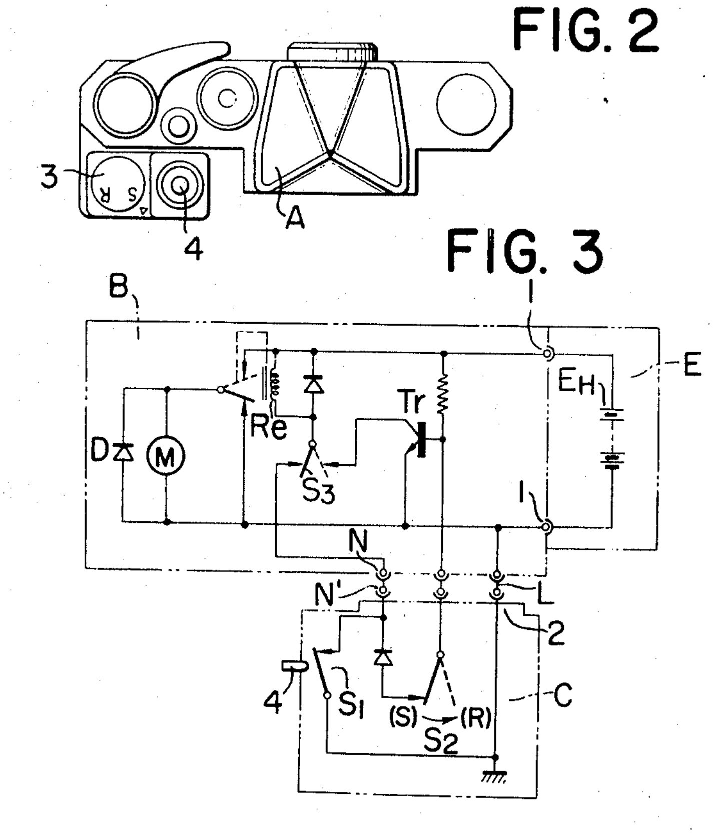
FIG. 2 is a plane external view of the same embodiment attached to the camera similar to FIG. 1.
FIG. 3 is a circuit diagram of motor-driven winding device.
Figures 4, 5:
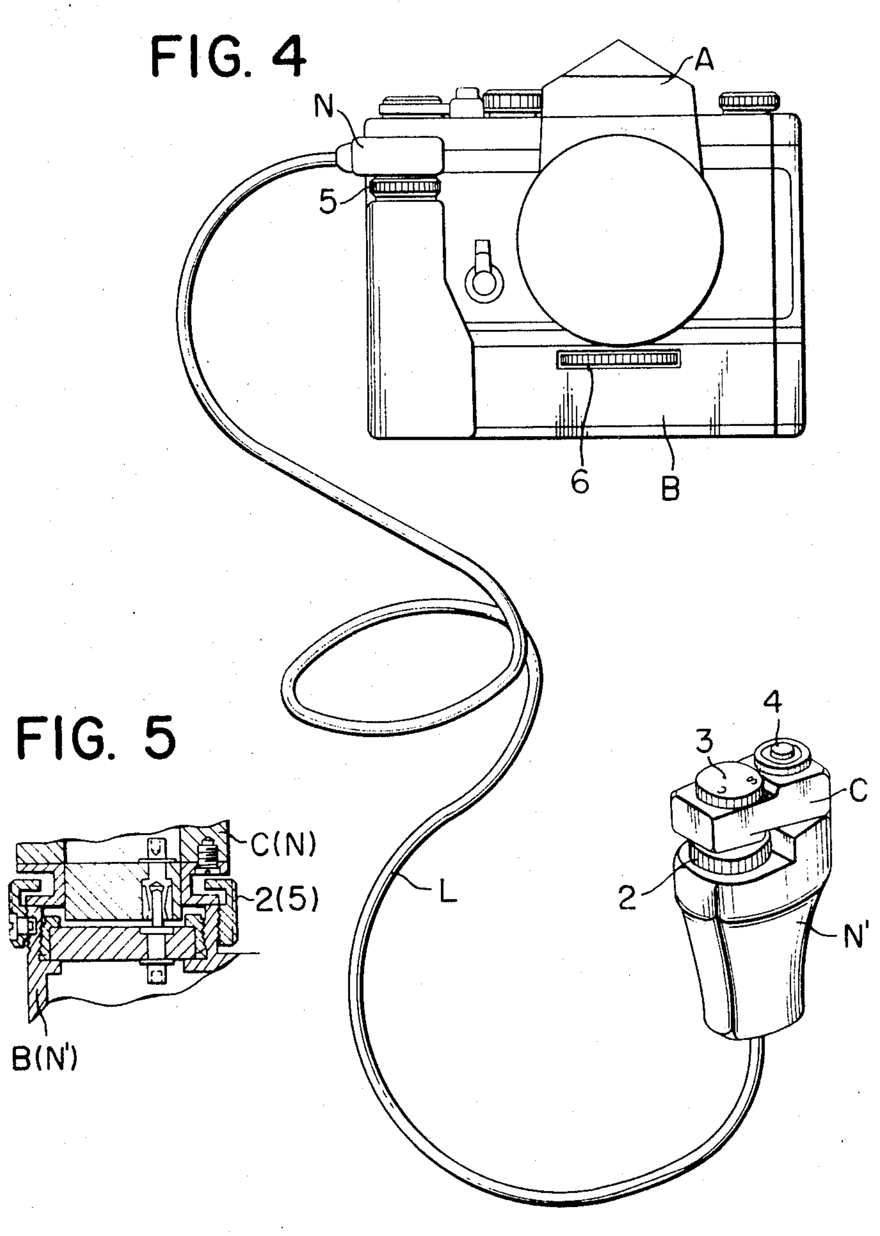
FIG. 4 is an external view of the same embodiment but in a state being remote controlled by means of a cord.
FIG. 5 is a cross section of the joint of the control device, the main unit, and the connector.

With reference to FIG. 3, motor M is stopped after the completion of shutter charging and film winding of an individual exposure (single-frame phototaking). When button 4 is depressed to close switch $S_1$, a circuit (battery EH - switch $S_1$ - switch $S_2$ - electrical magnetic relay Re - battery EH) is formed, whereby the switch contact of the relay Re is connected to the battery EH, as shown by the dotted line. Thus Motor M is rotated and the camera shutter is released. At the same time, the contact of switch $S_3$ is switched over to be connected to transistor Tr, but the transistor Tr is not actuated. Therefore, the circuit is opened. The switch of the relay Re is returned to the position indicated by solid line and the motor is stopped. In this case, both terminals of the motor M are short-circuited so that the rotation of the motor is suddenly stopped.

When the push button 4 is released to open the switch $S_1$, the connection from the battery EH thereto is broken so that transistor Tr is actuated to form a circuit of EH - Re - $S_3$ - Tr - EH. Thus, the relay switch Re is again connected to the battery EH as shown by dotted line so that motor M is rotated to thereby effect shutter charging and film winding. Upon the completion of these operations, switch $S_3$ is returned as shown by the solid line and the circuit of EH - Re - $S_3$ - Tr - EH is opened. Thus, the relay switch Re is again switched over as solid line to stop the rotation of motor M.

During the operation of sequential exposures, switch $S_2$ is switched over to the (R) position and the contact thereof is set as shown by the dotted line. In such manner, the base of transistor Tr is disconnected from switch $S_1$ by switch $S_2$ so that transistor is held in its actuated position. Accordingly, when shutter button 4 is depressed, relay Re is actuated to set the switch thereof, as shown by dotted line, notwithstanding of the switch-over operation of the switch $S_3$. Therefore, the motor M is continuously rotated and the shutter release, shutter charging and film winding operations are repeated.

When button 4 is released, switch $S_1$ is opened. UPon the completion of shutter charging and film winding operations switch $S_3$ is returned to the state shown by the solid line. Thus the current flow to relay Re is shut off so that the relay switch is returned to the position shown by solid line to thereby stop the rotation of the motor.

The circuit of the motor-driven section B and the circuit of the control device C are so connected directly to each other by means of the connecting section having the connector ring 2 or indirectly by means of the cord L having two connectors N and N' on both ends. The control device C is detachable from the motor-driven section B. The connector N' is formed in grip shape, and the change-over knob 3 of the control device C and operation push button 4 which are both on the connector are located within the operating range of the operator's fingers.

With such construction the change-over operation of switching between single-frame phototaking S and continuous phototaking R and the shutter operation can be performed easily while holding the camera. Additionally the change-over operation for switching between single-frame phototaking and continuous phototaking may be remote controlled by indirectly connecting control device C to the motor-driven section B by means of the cord.

What is claimed is:

1. A motor driving device for a photographic camera in which the shutter releasing operation and the shutter charging and film winding operation are performed by rotation of an electrical motor, the combination which comprises:

a driving unit carrying a clamping means adapted to removably attach said unit to the base of said camera and carrying said motor therein, a first electrical connecting means positioned on the outer wall of said unit, and said driving unit having a main circuit including an electrical magnetic relay, a transistor adapted to switch said camera between single-frame phototaking and continuous phototaking and a third switch operable in response to the shutter releasing operation and the shutter charging and film winding operation;

a control unit for actuating said main circuit removably mounted on said driving unit and having a second electrically connecting means engaging with said first electrically connecting means, a manually operable button, a fourth electrical switch coupled to said button to open and close said main circuit, and means for selectively switching either single-frame phototaking or continuous phototaking operations of said transistor including a manual operable member and a second switch connected to said transistor by said manual operable member when single-frame phototaking; and an electrically conductive cable having a first connector at its one end and a second connector at its opposite end, said first connector connectable to said first electrically connecting means and said second connector formed in hand grip shape and connectable to said electrically connecting means, for carrying the latter at its top end when said control unit is removed from said driving unit.

2. A motor driving device according to claim 1, wherein said driving unit has a projecting portion extending in front of the camera body, said first electrical connecting means being positioned on the top end of said projecting portion when the control unit is mounted directly on the driving unit.

* * * * *

UNITED STATES PATENT OFFICE
CERTIFICATE OF CORRECTION

Patent No. 3,753,391 Dated August 21, 1973

Inventor(s) SHUJI KIMURA

It is certified that error appears in the above-identified patent and that said Letters Patent are hereby corrected as shown below:

Column 2, line 15, delete --electric--;

Column 2, line 16, delete --source--;

Column 3, line 3, "UPon" should read --upon--;

After the application number, insert

--Foreign Application Priority Data
December 28, 1968 Japan U.M. 114132/1968--

Signed and sealed this 12th day of February 1974.

(SEAL)
Attest:

EDWARD M.FLETCHER,JR.
Attesting Officer

C. MARSHALL DANN
Commissioner of Patents